US009077748B1

(12) United States Patent
Hernacki et al.

(10) Patent No.: US 9,077,748 B1
(45) Date of Patent: Jul. 7, 2015

(54) EMBEDDED OBJECT BINDING AND VALIDATION

(75) Inventors: Brian Hernacki, Mountain View, CA (US); William E. Sobel, Jamul, CA (US)

(73) Assignee: Symantec Corporation, Mountain View, CA (US)

( * ) Notice: Subject to any disclaimer, the term of this patent is extended or adjusted under 35 U.S.C. 154(b) by 1470 days.

(21) Appl. No.: 12/141,022

(22) Filed: Jun. 17, 2008

(51) Int. Cl.
*G06F 11/00* (2006.01)
*H04L 29/06* (2006.01)
*G06F 21/56* (2013.01)

(52) U.S. Cl.
CPC .......... *H04L 63/1483* (2013.01); *G06F 21/565* (2013.01); *G06F 21/566* (2013.01); *H04L 63/1433* (2013.01)

(58) Field of Classification Search
CPC ... G06F 21/565; G06F 21/567; G06F 21/577; G06F 21/552; G06F 21/562; G06F 21/56; G06F 21/566; G06F 21/564; H04L 63/1483; H04L 63/1433; H04L 63/1416; H04L 63/20; H04L 63/1408; H04L 63/145; H04L 63/0428; H04L 63/1441; H04L 63/1458
USPC .............. 726/22–26; 713/188, 155–156, 170, 713/175
See application file for complete search history.

(56) References Cited

U.S. PATENT DOCUMENTS

| 6,658,394 | B1 * | 12/2003 | Khaishgi et al. ................ 705/58 |
| 7,111,246 | B2 * | 9/2006 | Sauve et al. .................... 715/809 |
| 7,114,177 | B2 * | 9/2006 | Rosenberg et al. ............... 726/4 |
| 7,313,691 | B2 * | 12/2007 | Bantz et al. .................... 713/155 |
| 7,774,604 | B2 * | 8/2010 | Lowe et al. ..................... 713/176 |
| 7,898,442 | B1 * | 3/2011 | Sovik ............................. 341/51 |
| 7,966,553 | B2 * | 6/2011 | Iverson .......................... 715/205 |
| 7,971,246 | B1 * | 6/2011 | Emigh et al. .................... 726/22 |
| 8,646,072 | B1 * | 2/2014 | Savant ............................ 726/22 |
| 2004/0107363 | A1 * | 6/2004 | Monteverde .................. 713/201 |
| 2005/0160286 | A1 * | 7/2005 | Currie et al. .................. 713/200 |
| 2006/0095404 | A1 * | 5/2006 | Adelman et al. .................... 707/3 |
| 2006/0106866 | A1 * | 5/2006 | Green et al. ............... 707/104.1 |
| 2006/0157722 | A1 * | 7/2006 | Takezawa et al. .............. 257/98 |
| 2006/0168066 | A1 * | 7/2006 | Helsper et al. ............... 709/206 |
| 2007/0016953 | A1 * | 1/2007 | Morris et al. ................... 726/24 |
| 2007/0107053 | A1 * | 5/2007 | Shraim et al. .................. 726/22 |
| 2007/0192855 | A1 * | 8/2007 | Hulten et al. ................... 726/22 |
| 2007/0245422 | A1 * | 10/2007 | Hwang et al. ................... 726/26 |
| 2008/0046738 | A1 * | 2/2008 | Galloway et al. ............ 713/176 |
| 2009/0037975 | A1 * | 2/2009 | Ishikawa et al. ................. 726/1 |
| 2013/0036466 | A1 * | 2/2013 | Penta et al. ..................... 726/22 |

* cited by examiner

*Primary Examiner* — Nirav B Patel
(74) *Attorney, Agent, or Firm* — Brill Law Office; Jeffrey Brill

(57) ABSTRACT

Unauthorized uses of embedded objects in websites are detected, in order to protect users from phishing sites using cloned copies of such objects. Authorized parties register objects for use at legitimate locations (e.g., specific IP address ranges or domains). When a client computing device accesses a website, the objects in the website are checked against the registered objects, to determine whether the objects are registered for use by the site being accessed. Depending upon trust status information concerning the objects, the access of the website can be permitted or blocked, or the user can be warned about questionable or un-trusted embedded objects. Additionally, the party that registered an object can be notified, in the case of an indication of unauthorized use of the object by a website.

12 Claims, 2 Drawing Sheets

EMBEDDED OBJECT BINDING AND VALIDATION

TECHNICAL FIELD

This invention pertains generally to computer security, and more specifically to protecting users from phishing websites that include unauthorized copies of design elements intended to identify legitimate websites.

BACKGROUND

Computer users are often victimized by phishing attacks, in which they unknowingly provide personal and confidential information to malicious websites. Phishing is an attempt to criminally and fraudulently acquire sensitive information, such as usernames, passwords and credit card details, by masquerading as a trustworthy entity in an electronic communication. Phishing attacks are commonly made by sending fraudulent emails or instant messages, and enticing users to click on a link and submit personal information to what appears to be a legitimate website.

Phishing websites are often crafted so as to appear to be well known, trusted websites (e.g., the website of a legitimated e-merchant or financial institution with which targeted users conduct business). DNS, attacks, browser flaws, and/or careless user behavior are then exploited to direct users to these "cloned" sites. Since a phishing site is constructed as a visual copy of the original, legitimate site, the user believes it is "real," and interacts with it, often disclosing personal information.

Many legitimate websites use distinctive and non-trivial design elements, such as javascript and flash objects, to create a more unique appearance and thereby attempt to make their sites harder to clone. Unfortunately, phishers have become very adept at capturing these graphic elements, and imbedding them in their phishing websites, thereby making them appear to be the legitimate originals. It would be desirable to be able to protect users from these phishing attack strategies.

SUMMARY

Unauthorized uses of embedded objects in websites are detected, in order to protect users from phishing sites using cloned copies of such objects. Authorized parties register objects for use at legitimate locations (e.g., specific IP address ranges or domains). When a client computing device accesses a website, the objects in the website are checked against the registered objects, to determine whether the objects are registered for use by the site being accessed. Depending upon trust status information concerning the objects, the access of the website can be permitted or blocked, or the user can be warned about questionable or un-trusted embedded objects. Additionally, the party that registered an object can be notified, in the case of an indication of unauthorized use of the object by a website.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
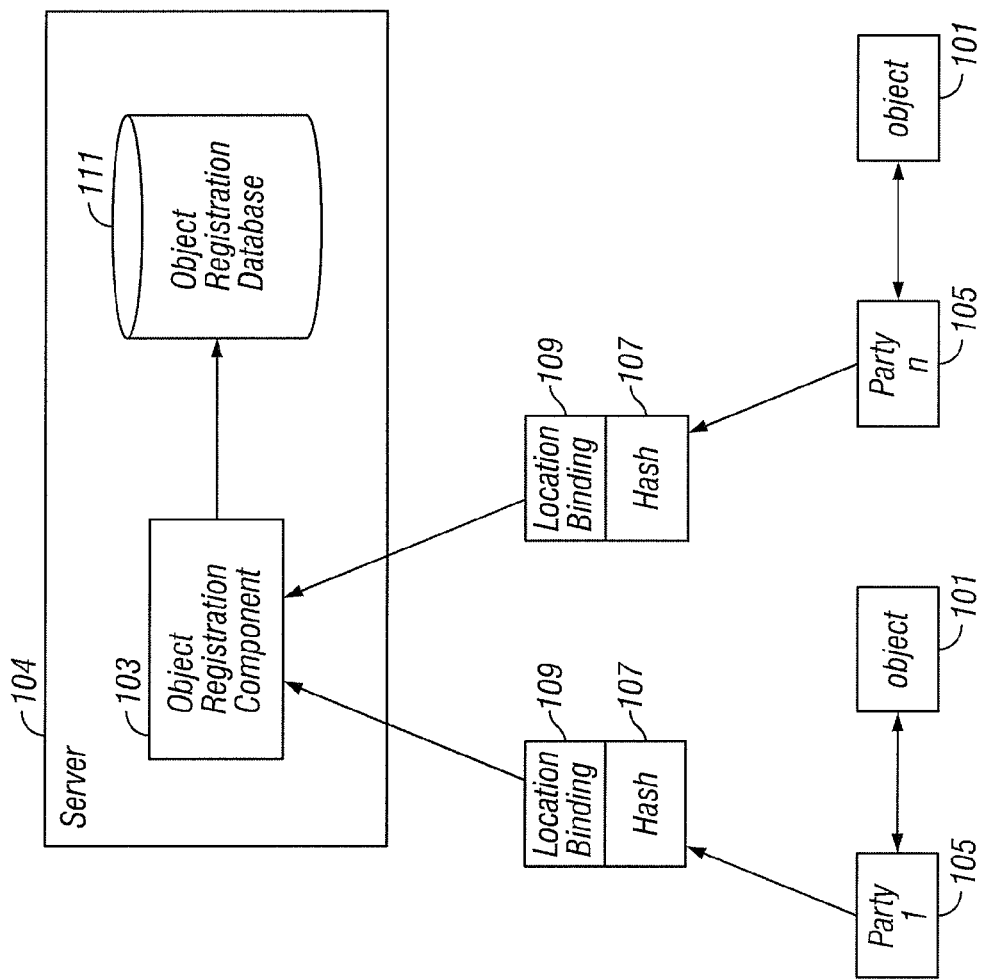
FIG. 1 is a block diagram illustrating registration of embedded objects for authorized use at specific locations, according to some embodiments of the present invention.

FIG. 1 illustrates a system 100 for protecting users against the embedding of cloned objects 101 in phishing web pages 102, according to some embodiments of the present invention. It is to be understood that although various components are illustrated in FIG. 1 as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As illustrated in FIG. 1, objects 101 that can be embedded in websites 102 (e.g., flash-based 'badges', logos, javascript objects) can be registered with an object registration component 103, running, for example, on a central server 104. A party 105 who wishes to register an object 101 (e.g., a system administrator or web master or the like) submits a hash 107 (or other suitable identifier) of the object 101 to the object registration component 103. In addition to the hash 107, the party 105 submits a location binding 109 for the object 101 (e.g., a domain, IP addresses range, geo-region, etc.). The location binding 109 specifies the location(s) at which the object 101 is to be registered for authorized use. For example, if the location binding 109 specifies an IP address range, the party 105 is indicating that the object 101 is to be registered for use only by websites 102 within that IP address range. The object registration component 103 receives registration information 107, 109 from a number of parties 105, and stores the registration information 107, 109 in a database 111 (or other storage mechanism).

The object registration component 103 can utilize any of a number of authentication and verification mechanisms to manage which parties 105 are allowed to register objects 101 for binding with which locations. A number of authentication and verification mechanisms are known to those of ordinary skill in the relevant art, and the use thereof within the context of the present invention will be readily apparent to those of such a skill level in light of this specification.

Figure 2:
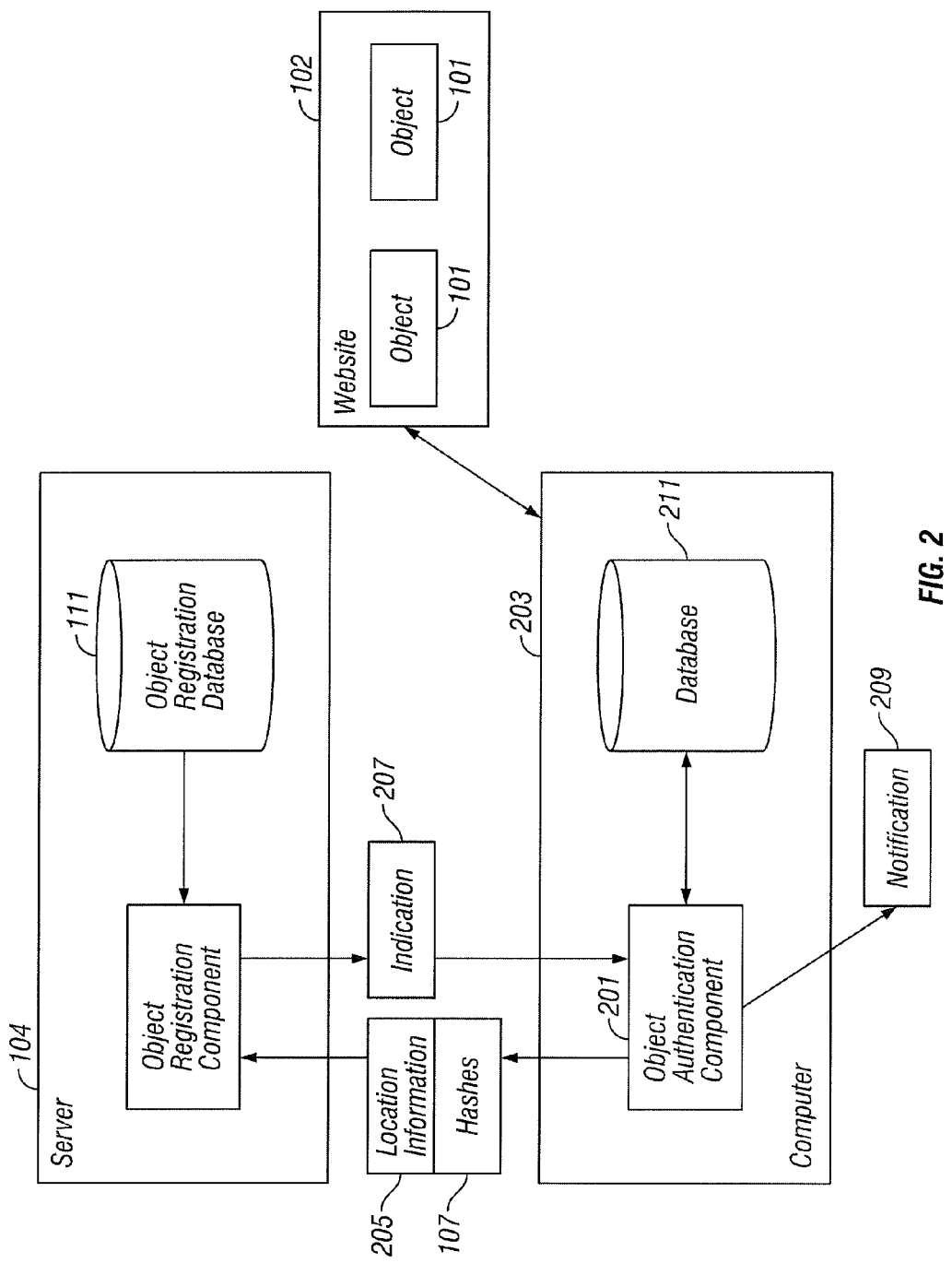
FIG. 2 is a block diagram illustrating determining trust status information for objects embedded in web pages, according to some embodiments of the present invention.

Turning now to FIG. 2, an object authentication component 201 runs on a user's computer 203. Whenever the computer 203 accesses a webpage 102, the object authentication component 201 notes all of the objects 101 embedded therein, and takes a hash 107 of each one. The object authentication component 201 transmits these hashes 107 and location information 205 concerning the website 102 being accessed to the central object registration component 103. The object registration component 103 searches for each submitted hash 107 in the database 111, determines whether the submitted hashes 107 correspond to registered objects 101, and if so, whether the objects 101 are registered for use by the website 102 that the user's computer 203 is accessing. In other words, if a given object 101 embedded in the website 102 being accessed is registered, the object registration component 103 determines with the location 205 of that website 102 is specified by the stored location binding 109 for the object 101. If so, the use of that object 101 by the website 102 being accessed is trusted. Otherwise, it is not trusted. If a given object 101 is not registered at all, this provides no definitive trust status information one way or the other. In any case, the object registration component 103 returns an indication 207 of the trust status (e.g., trusted, not trusted, unknown) for the objects 101 corresponding to the submitted hashes 107.

In one embodiment, the object authentication component 201 is implemented as a web browser plug-in, but it can also be implemented in other ways, such as a HTTP/HTTPS proxy (local or remote, configured or transparent). FIG. 2 illustrates the object authentication component 201 submitting a single transmission comprising hashes 107 of all embedded objects 101 in a given webpage 102, and the object registration component 103 returning a single indication 207 regarding the trust status of each object 101. In other embodiments, the object authentication component 201 can send each hash 107 individually, and the object registration component 103 in turn can generate and transmit a plurality of individual trust status indications 207. In another embodiment, rather than returning trust status indication(s) 207 comprising explicitly determined trust status(es), the object registration component 103 simply sends back location bindings 109 corresponding to submitted hashes 107. In this embodiment, the object authentication component 201 determines the trust status of given objects 101 itself based on the location binding 109 and the location of the site 102 being accessed.

As the object authentication component 201 receives (or generates) trust status indications 207 for the objects 101, it stores the indications 207 in a database 111 (or other storage mechanism) along with the corresponding hashes 107. This allows the object authentication component 201 to detect changes in an object's trust status over time. Additionally, upon receiving a trust status indication 207 for an object 101 embedded in a webpage 102 being accessed, the object authentication component 201 determines whether an entry for this object 101 (by hash 107) exists in the local database 111. If so, the object authentication component 201 examines the previous entry, and determines whether the object 101 was previously trusted and is now not trusted. This indicates that the user is likely accessing an illegitimate clone of a site 102 previously visited. If no previous entry exists but the current indication 207 is that the object 101 is not trusted, this indicates that the website 102 being accessed is not legitimate, but not as strongly as the case in which the trust status of the object 101 has been demoted. Additionally, the trust status for the object 101 can be "unknown" or "trusted."

Based on the trust status(es) of the object(s) 101 embedded in a given webpage 102, the object authentication component 201 takes appropriate action as desired. The specific actions to take are a variable design parameter. For example, where all the embedded objects 101 are trusted, the object authentication component 201 typically lets the user access the webpage 102 without taking any additional steps. Where the status of at least one object 101 is unknown, the object authentication component 201 can allow the access to proceed without warning, block the access, or provide the user with a notification 209 concerning the unregistered object(s) 101. Where at least one object 101 is not trusted and/or has been demoted in trust status, the object authentication component 201 typically blocks the access and/or alerts the user by providing a notification 209 as to which objects 101 are and/or are not trusted, etc. The exact method used for providing such a notification 209 is a variable design parameter. However, it typically is in the form of a visual indicator outside the content window, so as to prevent spoofing. Additionally, where un-trusted and/or demoted objects 101 are detected, the object authentication component 201 can report these objects 101 to the object registration component 103 (or some other type of central computer security service). In some embodiments, the object registration component 103 makes such determinations itself, based on the hash 107 submissions. The object registration component 103 can take any of a number of actions responsive to un-trusted and/or demoted objects 101, such as contacting the party 105 who registered the object initially, and/or taking steps to have the website 102 in which the un-trusted objects 101 are embedded taken down (not illustrated).

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media, as well as solid state/flash media. Additionally, software portions of the present invention can be instantiated (for example as object code or executable images) within the memory of any computing device. Accordingly, the disclosure of the present invention is intended to be illustrative, but not limiting, of the scope of the invention, which is set forth in the following claims.

What is claimed is:

1. A computer implemented method for detecting unauthorized uses of embedded objects in cloned websites, the method comprising the steps of:

during configuration:

receiving at least one request to register at least one object along with a plurality of registered objects on a plurality of websites, said at least one request uniquely identifying the at least one object to register and specifying at least one registered location at which the at least one object is to be registered for authorized use;

during authentication:

responsive to a visit to a web site containing an unknown object, determining whether the unknown object embedded in the website accessed by a computer device matches any of the plurality of registered objects;

responsive to determining that the unknown object matches at least one registered object, determining whether the registered location at which the registered object is authorized for use matches the accessed location;

providing a trust status concerning the unknown object based on the location matching determination, comprising:

determining that the trust status for the use is unknown, responsive to determining that the unknown object is not registered for authorized use by any location;

determining that the use of the unknown object by the site is trusted, responsive to determining that the unknown object is registered for authorized use by the site;

determining that the use of the object by the site is not trusted, responsive to determining that the unknown object is not registered for authorized use by the site but is registered for authorized use by at least one location; and determining that the trust status concerning use of the unknown object has been demoted, responsive to having previously determined a use of the unknown object by a site was trusted but currently determining that the at least one embedded object is not registered for authorized use by the site; and responsive to the trust status concerning at least one embedded object being demoted, informing a party associated with the authorized use of the unknown object cloning.

2. The method of claim 1 wherein receiving at least one request to register the at least one embedded object further comprises:

for each received request, executing at least one additional step to authenticate the request; and processing the request only in response to determining that the request is authentic.

3. The method of claim 1 further comprising performing at least one step from a group of steps consisting of:

receiving at least one indication from at least one computing device indicating that at the least one use of the unknown object is not trusted.

4. The method of claim 1 further comprising performing at least one step from a group of steps consisting of:

responsive to the unknown object not being trusted, informing a party associated with the authorized use of the embedded object;

responsive to at least one use of the unknown object not being trusted, for each at least one use, initiating a procedure to have a site using the unknown object taken down; and responsive to trust status concerning the unknown object being demoted, initiating a procedure to have a site currently using the unknown object taken down.

5. The method of claim 1 further comprising:

for each unknown object identified by the at least one received transmission, determining a trust status concerning authorization of use of the unknown object by the site.

6. The method of claim 1 wherein providing a response to the originating computing device indicating a trust status concerning the at least one embedded second object identified by the transmission further comprises performing at least one step from a group of steps consisting of:

providing a determined trust status; and providing location binding information concerning the unknown object.

7. At least one non-transitory computer readable medium storing a computer program product for detecting unauthorized uses of embedded objects in cloned websites, the computer program product comprising:

during configuration:

program code for receiving at least one request to register at least one object along with a plurality of registered objects on a plurality of websites, said at least one request uniquely identifying the at least one object to register and specifying at least one registered location at which the at least one object is to be registered for authorized use;

during authentication:

program code for, responsive to a visit to a web site containing an unknown object, determining whether the unknown object embedded in the website accessed by a computer device matches any of the plurality of registered objects;

program code for, responsive to determining that the unknown object matches at least one registered object, determining whether the registered location at which the registered object is authorized for use matches the accessed location;

program code for providing a trust status concerning the unknown object based on the location matching determination;

program code for detecting a change to the trust status on a subsequent determination responsive to a subsequent determination that the registered location at which the registered object is authorized for use does not match a subsequently accessed location, comprising:

determining that the trust status for the use is unknown, responsive to determining that the unknown object is not registered for authorized use by any location;

determining that the use of the unknown object by the site is trusted, responsive to determining that the unknown object is registered for authorized use by the site;

determining that the use of the object by the site is not trusted, responsive to determining that the unknown object is not registered for authorized use by the site but is registered for authorized use by at least one location; and determining that the trust status concerning use of the unknown object has been demoted, responsive to having previously determined a use of the unknown object by a site was trusted but currently determining that the at least one embedded object is not registered for authorized use by the site; and program code for, responsive to the trust status concerning at least one embedded object being demoted, informing a party associated with the authorized use of the unknown object cloning.

8. The computer program product of claim 7 wherein the program code for receiving at least one request to register the unknown object further comprises:

program code for, for each received request, executing at least one additional step to authenticate the request; and
program code for processing the request only in response to determining that the request is authentic.

9. The computer program product of claim 7 further comprising program code for performing at least one step from a group of steps consisting of:
   receiving at least one indication from at least one computing device indicating that at the unknown object is not trusted.

10. The computer program product of claim 7 further comprising program code for performing at least one step from a group of steps consisting of:
    responsive to the unknown object not being trusted, informing a party associated with the authorized use of the unknown object;
    responsive to at least one use of the unknown object not being trusted, for each at least one use, initiating a procedure to have a site using the unknown object taken down; and
    responsive to trust status concerning the unknown object being demoted, initiating a procedure to have a site currently using the unknown object taken down.

11. The computer program product of claim 7 further comprising:
    program code for, for each unknown object identified by the at least one received transmission, determining a trust status concerning authorization of use of the unknown object by the site.

12. The computer program product of claim 7 wherein the program code for providing a response to the originating computing device indicating a trust status concerning the unknown object identified by the transmission further comprises performing at least one step from a group of steps consisting of:
    providing a determined trust status; and
    providing location binding information concerning the unknown object.

* * * * *